(12) United States Patent
Geisberger et al.

(10) Patent No.: US 8,186,220 B2
(45) Date of Patent: May 29, 2012

(54) ACCELEROMETER WITH OVER-TRAVEL STOP STRUCTURE

(75) Inventors: Aaron A. Geisberger, Phoenix, AZ (US); Yizhen Lin, Gilbert, AZ (US); Andrew C. McNeil, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 568 days.

(21) Appl. No.: 12/400,441

(22) Filed: Mar. 9, 2009

(65) Prior Publication Data
US 2010/0223997 A1 Sep. 9, 2010

(51) Int. Cl.
*G01P 15/125* (2006.01)
(52) U.S. Cl. .................... 73/514.32; 73/514.38
(58) Field of Classification Search .............. 73/514.32, 73/514.33, 514.34, 514.29, 504.01, 514.36, 73/514.38
See application file for complete search history.

(56) References Cited

U.S. PATENT DOCUMENTS

| | | | | |
|---|---|---|---|---|
| 5,565,625 A * | 10/1996 | Howe et al. ................ | 73/514.16 |
| 5,572,057 A * | 11/1996 | Yamamoto et al. ........... | 257/417 |
| 5,627,397 A * | 5/1997 | Kano et al. .................... | 257/417 |
| 6,065,341 A * | 5/2000 | Ishio et al. .................. | 73/514.32 |
| 6,318,174 B1 * | 11/2001 | Schmiesing et al. ........... | 73/510 |
| 6,360,605 B1 * | 3/2002 | Pinter et al. ................. | 73/514.38 |
| 6,384,353 B1 | 5/2002 | Huang et al. | |
| 6,900,510 B2 | 5/2005 | Tamura et al. | |
| 7,121,141 B2 | 10/2006 | McNeil | |
| 7,258,011 B2 | 8/2007 | Nasiri et al. | |
| 7,322,242 B2 * | 1/2008 | Merassi et al. ............. | 73/514.38 |
| 7,389,691 B2 * | 6/2008 | Kai ........................... | 73/514.36 |
| 7,640,805 B2 * | 1/2010 | Diamond et al. .......... | 73/514.32 |
| 7,934,423 B2 * | 5/2011 | Nasiri et al. ............... | 73/514.02 |
| 2005/0131482 A1 | 6/2005 | Mattes et al. | |
| 2008/0001913 A1 | 1/2008 | Faase et al. | |
| 2008/0142914 A1 | 6/2008 | Diamond et al. | |

* cited by examiner

*Primary Examiner* — Helen C. Kwok
(74) *Attorney, Agent, or Firm* — Meschkow & Gresham, P.L.C.

(57) ABSTRACT

An accelerometer (50, 100, 120, 130) includes a substrate (58) and a proof mass (54) spaced apart from a surface (56) of the substrate (58). Compliant members (62) are coupled to the proof mass (54) and enable the proof mass (54) to move parallel to the surface (56) of the substrate (58) in a sense direction (68). Proof mass anchors (60) interconnect the compliant members (62) with the surface (56). The accelerometer (50, 100, 120, 130) includes an over-travel stop structure (52, 102, 122, 132) having stop anchors (70, 72) coupled to the substrate (58). The stop anchors (70, 72) are coupled to the substrate (58) at positions (76) on the surface (56) residing at least partially within an anchor attach area (71) bounded in the sense direction (68) by locations (78) of the proof mass anchors (60) on the surface (56).

13 Claims, 4 Drawing Sheets

PRIOR ART

ACCELEROMETER WITH OVER-TRAVEL STOP STRUCTURE

TECHNICAL FIELD OF THE INVENTION

The present invention relates generally to accelerometers. More specifically, the present invention relates to a microelectromechanical systems (MEMS) accelerometer with an over-travel stop structure arranged to mitigate adverse effects of package stress.

BACKGROUND OF THE INVENTION

Many devices and systems include various numbers and types of sensors that perform various monitoring and/or control functions. Advancements in micromachining and other micro fabrication techniques and associated processes have enabled manufacture of a wide variety of microelectromechanical systems (MEMS) devices. In recent years, many of the sensors that are used to perform monitoring and/or control functions have been implemented into MEMS devices.

One particular type of MEMS sensor that is used in various applications is an accelerometer. Typically, a MEMS accelerometer includes, among other component parts, a movable element, also referred to as a proof mass. The proof mass is resiliently suspended by one or more suspension springs such that it moves when the MEMS accelerometer experiences acceleration. The motion of the proof mass may then be converted into an electrical signal having a parameter magnitude (e.g., voltage, current, frequency, etc.) that is proportional to the acceleration.

In some instances, a MEMS accelerometer may experience harsh accelerations or a relatively high force. In such an instance, the proof mass can move beyond a desired distance. Such, movement can potentially damage the MEMS accelerometer. Additionally, the MEMS accelerometer can exhibit unstable behavior if the proof mass, sense electrodes, and/or other portions of the MEMS accelerometer travel too far when a voltage is applied to the MEMS device. Accordingly, many MEMS accelerometers include one or more types of distance limiters, typically referred to as over-travel stops or travel stops. These over-travel stops are arranged to limit the movement of the proof mass and/or other portions of the MEMS accelerometer.

MEMS accelerometers typically have requirements, or specifications, for overload performance. These requirements place tight restrictions on the over-travel stop structure. That is, the over-travel stop must allow the proof mass to travel a specific distance with little variation in accuracy over a relatively large temperature range.

FIG. 1 shows a top view of a prior art accelerometer 20 having over-travel stops 22. Accelerometer 20 includes a proof mass 24 suspended above and anchored to an underlying substrate 26 via one or more proof mass anchors 28. More particularly, one or more compliant members 30, or springs, interconnect proof mass 24 with proof mass anchors 28. Proof mass 24 includes a number of movable fingers, or movable electrodes 32. Fixed electrodes 34, which may be some combination of sense electrode and/or actuator electrodes, are positioned between pairs of movable electrodes 32, and are formed on or otherwise attached to substrate 26. The horizontal and vertical elements of the illustrated proof mass 24 are represented by a single width lines for simplicity of illustration. However, it should be understood that in actuality these horizontal and vertical elements of proof mass 24 have an actual thickness which could alternatively be represented by a double line.

Accelerometer 20 represents a typical single axis accelerometer. Accordingly, compliant members 30 enable movement of proof mass 24 when accelerometer 20 experiences acceleration in an x-direction 36 substantially parallel to a plane of substrate 26. Movement of proof mass 24 alters capacitances 38 between movable and fixed electrodes 32 and 34 used to determine differential or relative capacitance indicative of the acceleration. It should be understood that physical capacitor structures are not present between movable and fixed electrodes 32 and 34. Rather, capacitor symbols 38 are shown to represent the changing capacitances between movable and fixed electrodes 32 and 34. Over-travel stops 22 limit movement of proof mass 24 when accelerometer 20 experiences harsh or excessive acceleration in x-direction 36 to prevent damage to proof mass 24, sense electrodes 32, 34, and/or other portions of accelerometer 20.

Typically, over-travel stops 22 are anchored, or attached, to substrate 26 at a location convenient to over-travel stops 22. It should be noted that when proof mass 24 is not subjected to acceleration in x-direction 36, a stop gap 40 is present between over-travel stops 22 and a periphery 42 of proof mass 24. Stop gap 40 defines the distance that proof mass 24 is allowed to travel, or move, until it hits one or more of over-travel stops 22. Unfortunately, significant inconsistencies in a width 44 of stop gap 40 have been detected over varying temperatures of accelerometer 20. These inconsistencies in width 44 of stop gap 40 can degrade overload performance of accelerometer 20 and/or can result in loss of accuracy at overload conditions.

Accordingly, there is a need for an improved MEMS accelerometer that is not prone to damage resulting from impacts involving the functional components and is highly accurate over various operational temperatures.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figure 2:
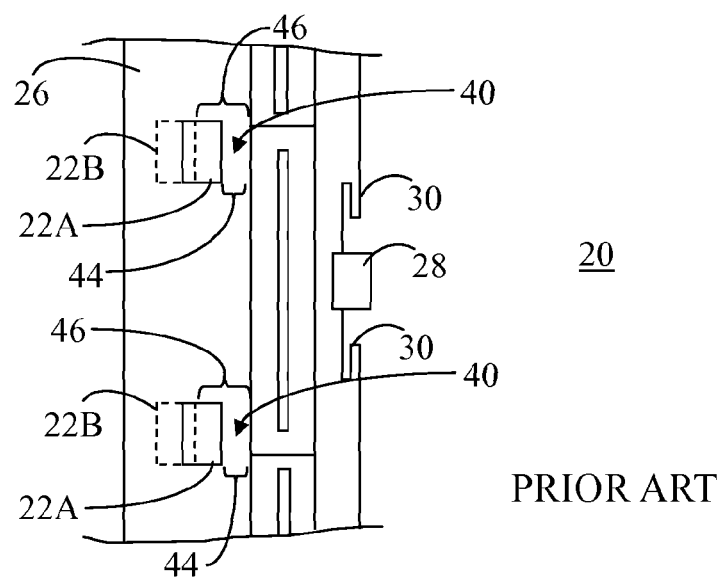
FIG. 2 shows a top view of a portion of the prior art accelerometer of FIG. 1 exemplifying displacement of over-travel stops due to substrate stain.

FIG. 2 shows a top view of a portion of accelerometer 20 exemplifying displacement of over-travel stops 22 due to substrate strain. The inconsistencies in width 44 of stop gap 40 have been identified as being a result of package stress that induces strain on substrate 26 to which over-travel stops 22 and proof mass anchors 28 are attached. Strain in substrate 26 can result in displacement of over-travel stops 22 fixed to substrate 26 relative to the location of proof mass anchors 28. This scenario is illustrated in FIG. 2, in which over-travel stops, represented by the reference numeral 22B and denoted by dashed lines, are displaced from the original, i.e., desired, position of the travel stops, represented by the reference numeral 22A and denoted by solid lines. This displacement results in a width 46 between over-travel stops 22 and proof mass 24 that is different from the desired width 44.

The strain on substrate 26 can be formed in substrate 26 during high temperature manufacturing processes. Indeed, this strain on substrate 26 can be evident in accelerometer 20 at room temperature and has been observed to change width 44 of stop gap 40 by as much as twenty percent. This strain in substrate 26, and the commensurate change in width 44 of stop gap 40, can be exacerbated during varying operational temperatures of accelerometer 20 resulting in the degradation of overload performance of accelerometer 20 and/or resulting in loss of accuracy at overload conditions.

An embodiment of the invention entails an accelerometer that includes a proof mass and an over-travel stop structure disposed on an underlying substrate and arranged to mitigate problems associated with substrate strain. More particularly, the over-travel stop structure includes stop anchors coupled to the surface of the substrate residing within an anchor attach area bounded in a sense direction by locations of proof mass anchors that couple a movable proof mass to the substrate. Thus, the stop anchors are centrally positioned relative to locations of the proof mass anchors. As such, the displacement of the stop anchors due to substrate strains is matched to the resulting average displacement of the proof mass anchors due to substrate strains.

Figure 1:
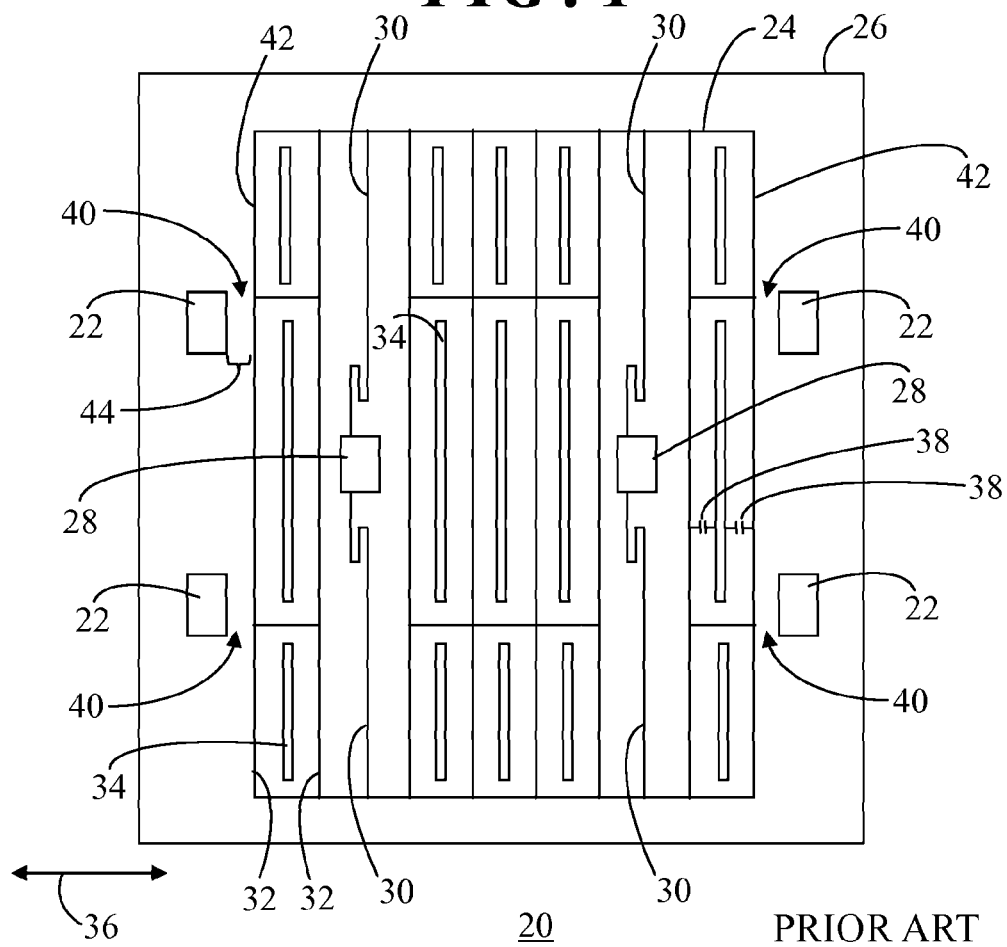
FIG. 1 shows a top view of a prior art accelerometer having over-travel stops.
Figure 3:
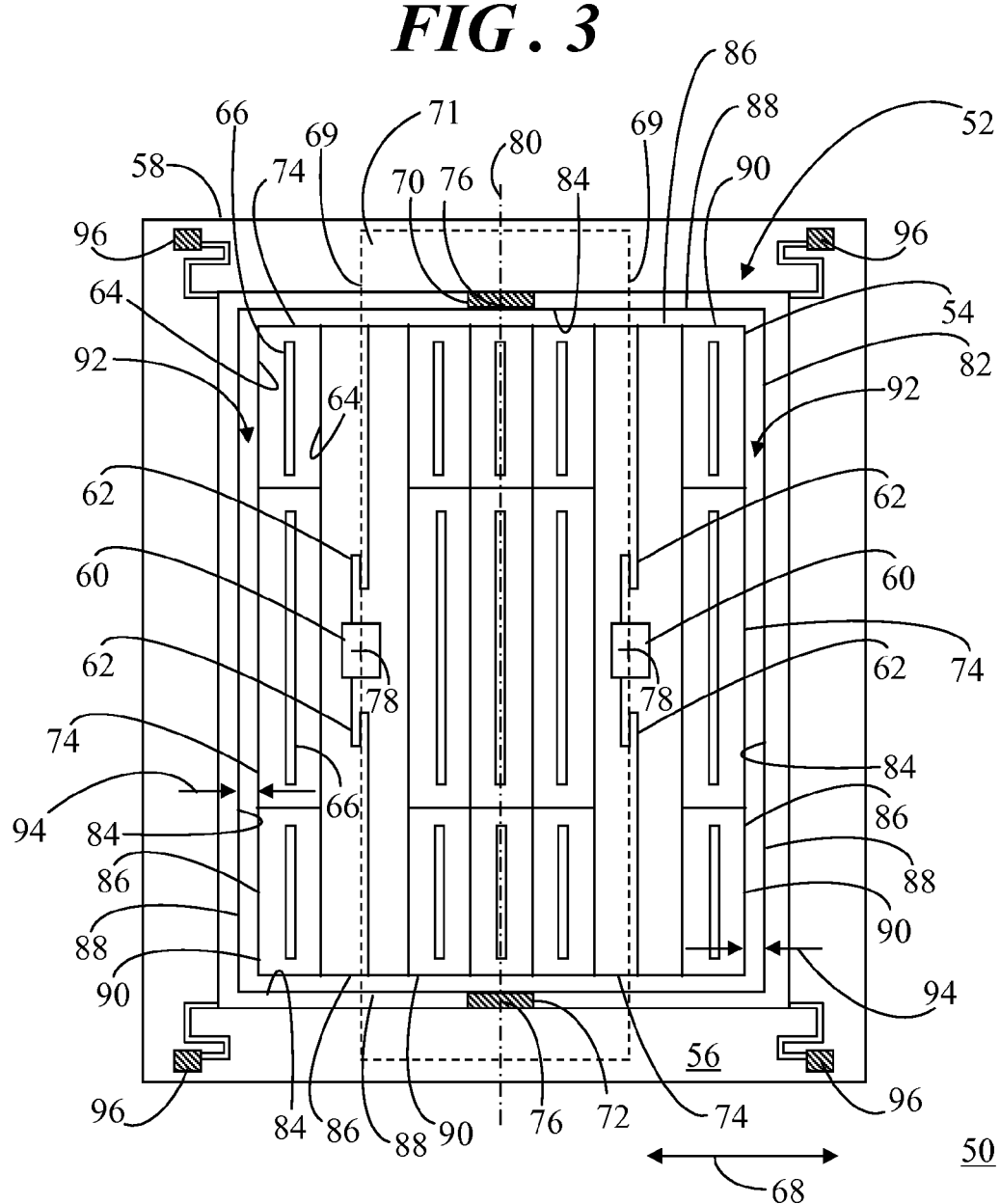
FIG. 3 shows a top view of an accelerometer having an over-travel stop structure according to an embodiment of the invention.
Figure 4:
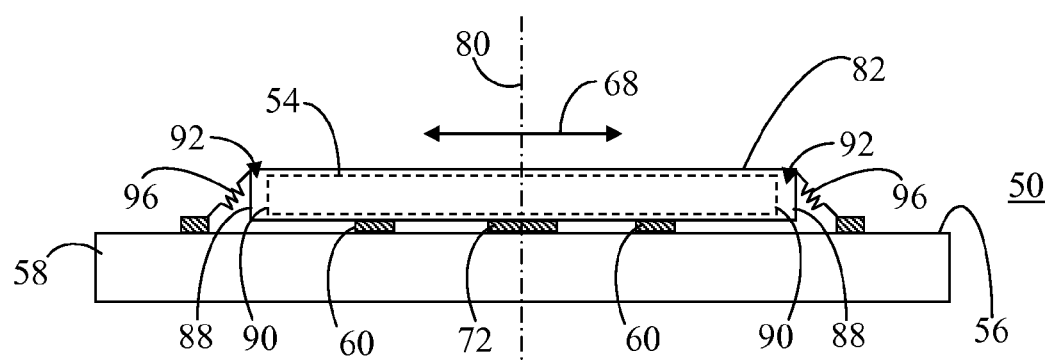
FIG. 4 shows a side view of the accelerometer of FIG. 3.

Referring to FIGS. 3 and 4, FIG. 3 shows a top view of an accelerometer 50 having an over-travel stop structure 52 according to an embodiment of the invention, and FIG. 4 shows a side view of accelerometer 50. Accelerometer 50 includes a proof mass 54 positioned in spaced apart relationship above a surface 56 of an underlying substrate 58. Like proof mass 24 (FIG. 1), the horizontal and vertical elements of proof mass 54 are represented by single width lines for simplicity of illustration. However, it should be understood that in actuality these horizontal and vertical elements of proof mass 54 have an actual thickness which could alternatively be represented by a double line.

Proof mass 54 is anchored to substrate 58 via one or more proof mass anchors 60. More particularly, one or more compliant members 62, or springs, interconnect proof mass 54 with proof mass anchors 60. Proof mass 54 includes a number of movable fingers, or movable electrodes 64. Fixed electrodes 66, which may be some combination of sense electrode and/or actuator electrodes, are positioned between pairs of movable electrodes 64, and are formed on or otherwise attached to surface 56 of substrate 58.

Accelerometer 50 represents a single axis accelerometer. Accordingly, compliant members 62 enable movement of proof mass 54 when accelerometer 50 experiences acceleration in a sense direction 68 substantially parallel to a plane of substrate 58, and referred to hereinafter as an x-direction 68. Movement of proof mass 54 produces capacitances between movable and fixed electrodes 64 and 66 used to determine differential or relative capacitance indicative of the acceleration.

Various structures of accelerometer 50, such as proof mass 54, electrodes 64, 66, compliant members 62, and proof mass anchors 60 are provided for illustrative purposes. It should be understood by those skilled in the art that these various structures may take different forms in accordance with particular design constraints. For example, proof mass 54 may have a different shape and/or there may be varying quantities and arrangements of electrodes 64 and 66. In this exemplary embodiment, there are a total of two proof mass anchors 60, and two compliant members 62 interconnect each of proof mass anchors 60 with proof mass 54. However, the quantity and location of proof mass anchors 60 and/or compliant members 62 may vary. For example, in alternative embodiments, there may be only a single proof mass anchor or there may be more than two proof mass anchors. Similarly, in alternative embodiments, only a single compliant member may be interposed between a proof mass anchor and the proof mass.

In accordance with an embodiment, proof mass anchors 60 are positioned on surface 56 at a perimeter 69 of an anchor attach area 71 in x-direction 68. Said another way, locations 78 of proof mass anchors 60 establish an outer boundary for anchor attach area 71 in the sense direction, i.e., x-direction 68. Anchor attach area 71 defines an allowable region on surface 56 of substrate 58 for positioning stop anchors (discussed below) of over-travel stop structure 52. Anchor attach area 71 is represented by dashed lines to denote that it is a region bounded by perimeter 69, and not an actual structure of accelerometer 50. As will be discussed in greater detail below, coupling the stop anchors in positions residing at least partially within anchor attach area 71 can result in matched displacement of the stop anchors due to substrate strains relative to the resulting average displacement of the proof mass anchors due to substrate strains, thereby improving overload performance of accelerometer 50.

Over-travel stop structure 52 includes stop anchors 70 and 72 coupled to surface 56 of substrate 58 external to a periphery 74, or outer boundary, of proof mass 54. Stop anchors 70 and 72 are coupled on surface 56 at positions 76 residing within anchor attach area 71. More particularly, stop anchors are positioned generally central relative to locations 78 of proof mass anchors 60 on surface 56. That is, positions 76 of stop anchors 70 and 72 are situated at, along, or near a center defined by locations 78 of proof mass anchors 60. In the illustrated embodiment, a centerline 80 of anchor attach area 71, oriented substantially parallel to the plane of substrate 58, is established relative to locations 78. Centerline 80 is generally centered between proof mass anchors 60 and is perpendicular to the sense direction of accelerometer 50, i.e., x-direction 68. The centering of stop anchors 70 and 72 results in positions 76 for stop anchors 70 and 72 being located along centerline 80.

In an embodiment having a single proof mass anchor 60, centerline 80 would bisect the single proof mass anchor 60. In accordance with the invention, the single proof mass anchor 60 is positioned on perimeter 69 of anchor attach area 71. Consequently, centerline 80 also defines anchor attach area 71 in such an embodiment. Thus, stop anchors 70 and 72 would be coupled to substrate 58 at positions 76 residing at least partially on centerline 80 so as to achieve the central configuration of stop anchors 70 and 72.

Over-travel stop structure 52 further includes a stop frame 82 that encircles periphery 74 of proof mass 54. Stop frame 82 is suspended above, or otherwise released from, surface 56 of substrate 58, but is in fixed or non-moving relation with substrate 58 via its attachment to each of stop anchors 70 and 72. The suspension of stop frame 82 reduces the potential for strain in substrate 58 adversely displacing or deforming stop frame 82.

Stop frame 82 exhibits an inner perimeter 84, i.e., the distance around an inside surface of stop frame 82, that is greater than an outer perimeter 86, i.e., the distance around periphery 74, of proof mass 54. In the illustrated embodiment, the length of each of four contiguous inner walls 88 of stop frame 82, which makes up inner perimeter 84, is longer than the corresponding length of each of the four contiguous outer walls 90 of proof mass 54, which makes up outer perimeter 86 of proof mass 54. Accordingly, a stop gap 92 is present between each of inner walls 88 of stop frame 82 and the facing outer walls 90 of proof mass 54.

In the illustrated embodiment, stop frame 82 generally encircles the entirety of periphery 74 of proof mass 54. However, in alternative embodiments different geometries for stop frame 82 may be employed. For example, stop frame 82 may be an L- or U-shaped bracket that still maintains stop gap 92 between stop frame 82 and at least one outer wall 90 of proof mass 54. Stop frame 82 may additionally carry other features such as protrusions and/or slots for better over-travel presentation functions.

A width 94 of stop gap 92 defines the distance that proof mass 54 is allowed to travel, or move, until it hits a portion of stop frame 82. Accordingly, stop frame 82 is spaced apart from periphery 74 of proof mass 54 by stop gap 92 during nominal movement of proof mass 54. However, when MEMS accelerometer 50 experiences a harsh acceleration environment or excessive force, proof mass 54 is subjected to overload movement causing proof mass 54 to contact stop frame 82. Stop frame 82 is much stiffer than compliant members 62 interconnected with proof mass 53. Thus, stop frame 82 significantly limits motion of proof mass 54 when proof mass 54 contacts stop frame 82.

The placement of stop anchors 70 and 72 within anchor attach area 71 results in positions 76 of stop anchors 70 and 72 being central relative to locations 78 of proof mass anchors 60 that couple movable proof mass 54 to substrate 58. As such, the displacement of stop anchors 70 and 72 due to substrate strains during high temperature manufacturing and/or varying operational temperatures is matched to the resulting average displacement of proof mass anchors 60 (and commensurately proof mass 54) due to substrate strains. This matched displacement results in width 94 of stop gap 92 being largely unchanging in response to varying temperature environments. Rather, width 94 appropriately changes in response to the movement of proof mass 54 due to acceleration in x-direction 68.

Accordingly, over-travel stop structure 52 provides distance limitation to meet requirements for overload performance so as to reduce the potential for damage during overload movement of proof mass 54. Furthermore, any displacement of stop anchors 70 and 72 is matched with the displacement of proof mass 54 thereby significantly reducing potential change in width 94 of stop gap 92 in varying temperature environments, while increasing overload performance and MEMS accelerometer 50 accuracy over various operational temperatures.

In an embodiment, MEMS accelerometer 50 may further include a number of compliant anchor members 96 interconnected between the outer edges of walls 88 of stop frame 82 and substrate 58. In the illustrated embodiment, one of compliant anchor members 96 couples a corner of stop frame 82 to surface 56 of substrate 58. Compliant anchor members 96 can provide more rigidity to stop frame 82 to limit movement of stop frame 82 in the z-direction, i.e., in a direction perpendicular to the plane of substrate 58. In alternative embodiments, MEMS accelerometer 50 may include fewer or more compliant anchor members 96 than those shown, and/or compliant anchor members 96 may be attached elsewhere on stop frame 82 than that shown. Compliant anchors 96 are represented by spring symbols in FIG. 4 for simplicity of illustration. Those skilled in the art will recognize that compliant anchors 96 can take on various structural forms in actual practice.

Figure 5:
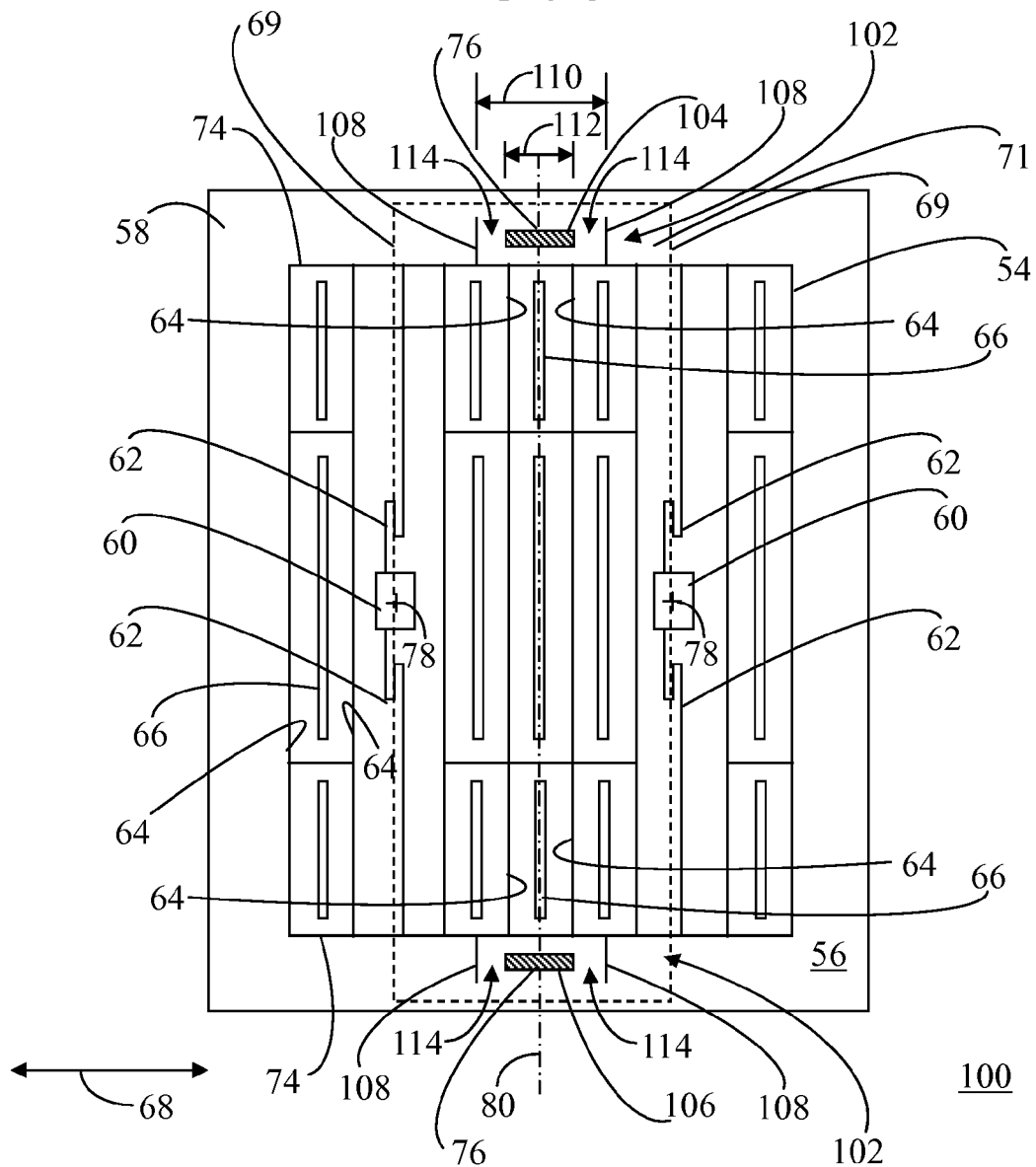
FIG. 5 shows a top view of an accelerometer having an over-travel stop structure according to another embodiment of the invention.
Figure 6:
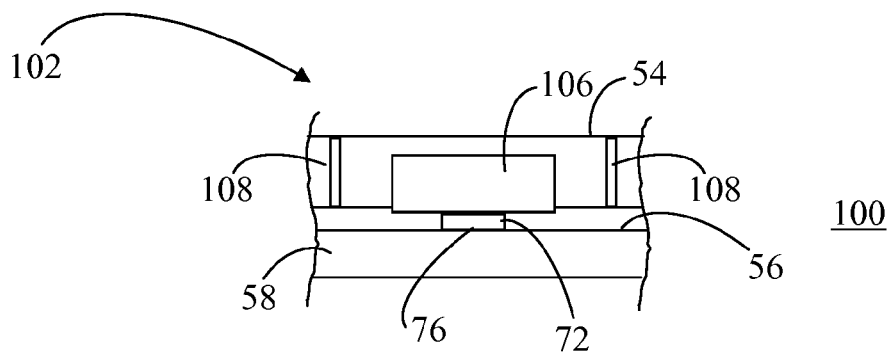
FIG. 6 shows a partial side view of the accelerometer of FIG. 5.

Referring to FIGS. 5-6, FIG. 5 shows a top view of a MEMS accelerometer 100 having an over-travel stop structure 102 according to another embodiment of the invention, and FIG. 6 shows a partial side view of MEMS accelerometer 100. Such an over-travel stop structure 102 may be simpler to manufacture and may utilize less surface area of substrate 58, relative to over-travel stop structure 102. However, structural rigidity may be somewhat decreased relative to stop frame 82 (FIG. 3). MEMS accelerometer 100 includes many elements that are common to MEMS accelerometer 50 (FIG. 3). These elements will be referred to by the same reference numerals utilized in connection with MEMS accelerometer 50. In addition, a detailed description of these elements will not be repeated herein for brevity. As such, MEMS accelerometer 100 includes substrate 58, proof mass 54, electrodes 64, 66, compliant members 62, and proof mass anchors 60. Again, it should be noted that the vertical and horizontal elements of proof mass 54 are represented in FIG. 5 by single width lines for simplicity of illustration.

In the alternative embodiment of FIG. 5, over-travel stop structure 102 of MEMS accelerometer 100 includes stop anchors 70 and 72 (one of which is visible in FIG. 6) coupled to surface 56 of substrate 58 at positions 76 residing within anchor attach area 71, and more particularly residing along centerline 80. Stop posts 104 and 106 are coupled to, or integrally formed with, stop anchors 70 and 72. Stop posts 104 and 106 extend above surface 56 of substrate 58. Over-travel stop structure 102 further includes extension members 108 extending from periphery 74 of proof mass 54, and each of stop posts 104 and 106 is located between a pair of extension members 108.

In this alternative embodiment, each pair of extension members 108 is separated by a spacing 110 and each of stop posts 104 and 106 exhibits a width 112. Width 112 is less than spacing 110 such that a stop gap 114 is present on either side of each stop post 104 and 106. As such, each of stop posts 104 and 106 is spaced apart from corresponding pairs of extension members 108 during nominal movement of proof mass 54. However, when MEMS accelerometer 100 experiences a harsh acceleration environment or excessive force, proof mass 54 is subjected to overload movement causing an extension member 108 from each pair of extension members 108 to contact stop posts 104 and 106.

Stop post 104, stop post 106, and extension members 108 are illustrated as extending outwardly from periphery 74 so that they are located external to proof mass 54. In alternative embodiments, stop anchors 70 and 72, along with their associated stop posts 104 and 106, may be positioned internal to proof mass 54. For example, electrodes 66 at centerline 80 may be absent or reduced in size to accommodate placement of stop anchors 70 and 72, with stop posts 104 and 106. In such a configuration, the structural portion of proof mass 54 that serves as electrodes 64 on immediately opposing sides of centerline 80 would thus serve as the pairs extension members 108 extending from periphery 74.

Figure 7:
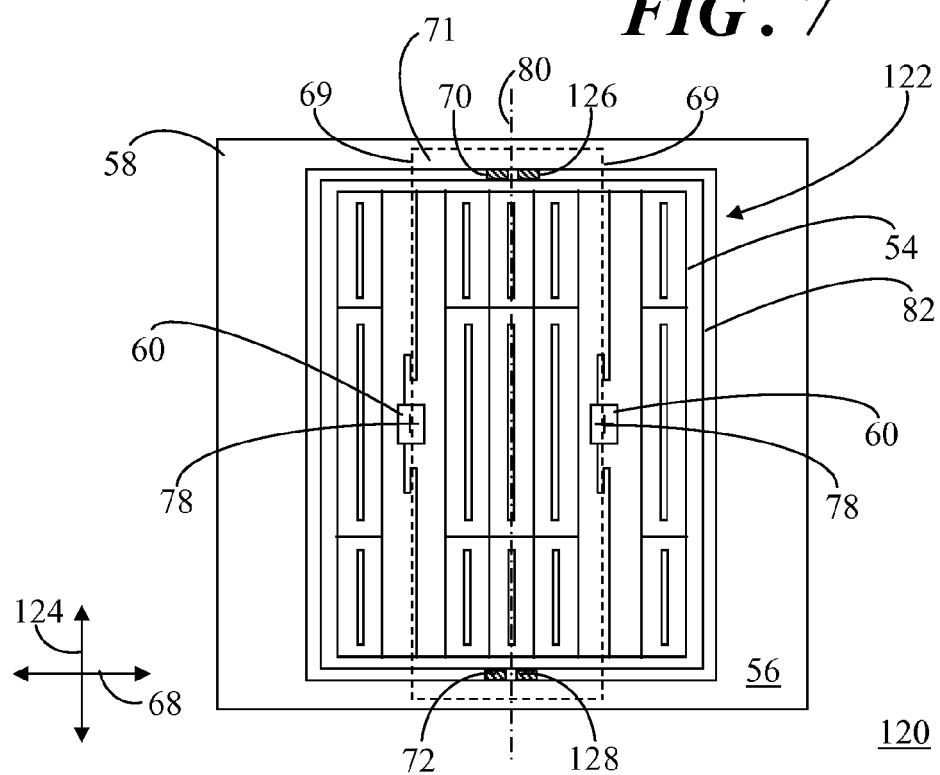
FIG. 7 shows a top view of an accelerometer having an over-travel stop structure according to another embodiment of the invention.

FIG. 7 shows a top view of a MEMS accelerometer 120 having an over-travel stop structure 122 according to another embodiment of the invention. Again, the same reference numerals are utilized for elements common to MEMS accelerometer 50 (FIG. 3) and MEMS accelerometer 100 (FIG. 5), and detailed description of those elements is not repeated for brevity. Additionally, the vertical and horizontal elements of proof mass 54 are represented by single width lines for simplicity of illustration.

As discussed above, over-travel stop structures 52 (FIG. 3) and 102 (FIG. 5) are illustrated with their corresponding stop anchors 70 and 72 residing within anchor attach area 71 and centered along centerline 80. In alternative embodiments, stop anchors 70 and 72 may be shifted off of centerline 80, but may still be central, i.e., residing at least partially within anchor attach area 71, relative to the separate locations 78 of proof mass anchors 60. For example, over-travel stop structure 122 includes stop anchors 70 and 72 aligned with one another in a y-direction 124 parallel to a plane of substrate 58. In addition, over-travel stop structure 122 includes a stop anchor 126 aligned in x-direction 68 with stop anchor 70 and a stop anchor 128 aligned in x-direction 68 with stop anchor 72. Stop anchors 126 and 128 are also aligned with one another in y-direction 124. Stop frame 82 of over-travel stop structure 122 is thus suspended above surface 56 of substrate 58 via its attachment to stop anchors 70, 72, 126, and 128.

As shown, each of stop anchors 70, 72, 126, and 128 is offset from centerline 80 by an equivalent distance. However, their aligned and balanced orientation on surface 56 of substrate 58, and their placement within anchor attach area 71 between proof mass anchors 60 results in stop anchors 70, 72, 126, and 128 being generally central relative to distinct locations 78 of proof mass anchors 60. In alternative embodiments, each of stop anchors 70, 72, 126, and 128 may be offset from centerline 80 by an equivalent, but greater distance. For example, each of stop anchors 70, 72, 126, and 128 may be positioned at perimeter 69 in alignment with locations 78 of stop anchors 60 so that at least a portion of each of stop anchors 70, 72, 126, and 128 resides within anchor attach area 71.

Figure 8:
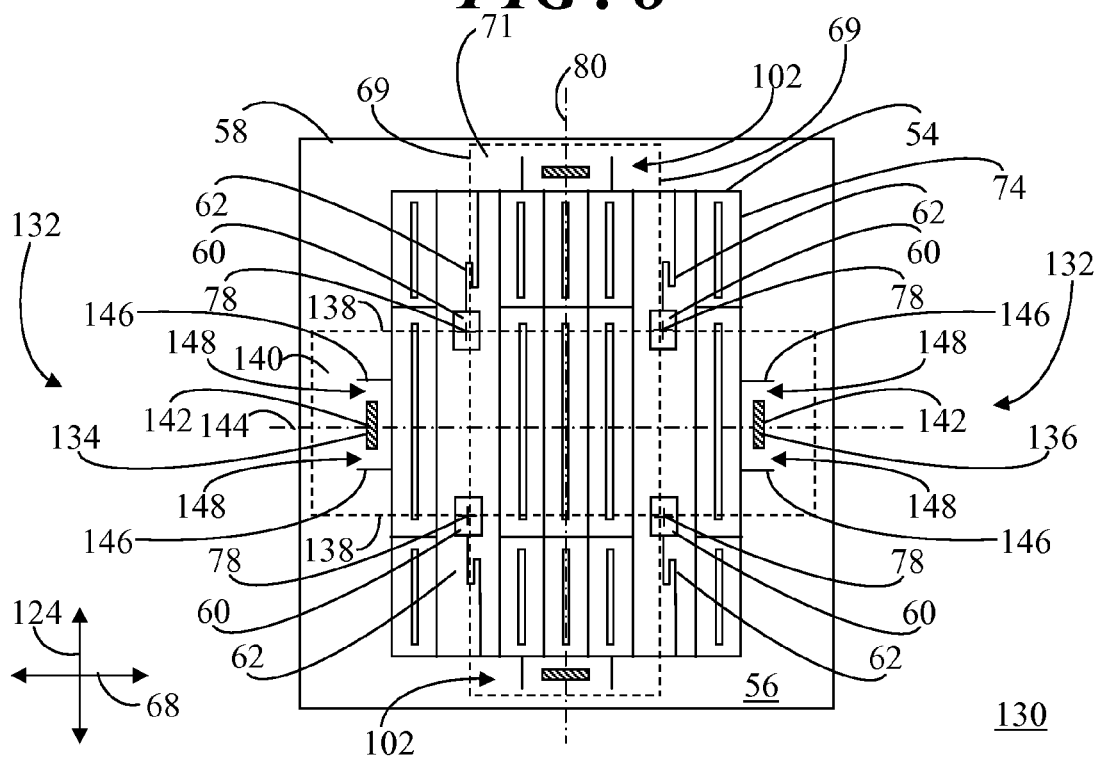
FIG. 8 shows a top view of an accelerometer having an over-travel stop structure according to another embodiment of the invention.

FIG. 8 shows a top view of a MEMS accelerometer 130 according to another embodiment of the invention. Previous discussion focused on single axis accelerometers. The exemplary illustration of MEMS accelerometer 130 implements the central configuration of stop anchors relative to proof mass anchors in a dual axis accelerometer package. Again, the same reference numerals are utilized for elements common to the previously discussed MEMS accelerometers and detailed description of those elements is not repeated for brevity. Additionally, the vertical and horizontal elements of proof mass 54 are represented by single width lines for simplicity of illustration.

In contrast to previous embodiments, MEMS accelerometer 130 includes proof mass 54 suspended by four proof mass anchors 60 via compliant members 62. A pair of proof mass anchors 60 is offset from centerline 80 and is aligned in y-direction 124. Likewise, another pair of proof mass anchors 60 is offset on the other side of centerline 80 and is also aligned in y-direction 124.

MEMS accelerometer 130 includes over-travel stop structure 102 that limits movement of proof mass 54 in x-direction 68. In addition, MEMS accelerometer 130 includes an over-travel stop structure 132 adapted to limit movement of proof mass 54 in y-direction 124. Like over-travel structure 102, discussed in detail in connection with FIGS. 5-6, over-travel stop structure 132 includes stop anchors (not visible) coupled to surface 56 of substrate 58. Stop posts 134 and 136 are coupled to, or integrally formed with, the underlying stop anchors and extend above surface 56 of substrate 58.

In accordance with this alternative embodiment, proof mass anchors 60 are positioned on surface 56 at a perimeter 138 of an anchor attach area 140 in y-direction 124. Said another way, locations 78 of proof mass anchors 60 establish an outer boundary for anchor attach area 140 in the second sense direction, i.e., y-direction 124. Anchor attach area 140 defines an allowable region on surface 56 of substrate 58 for positioning the stop anchors of over-travel stop structure 132. By way of example, stop posts 134 and 136, with their associated stop anchors (not visible), are placed at positions 142 along a centerline 144 that is perpendicular to the sense direction, i.e. y-direction 124. Over-travel stop structure 132 further includes extension members 146 protruding from periphery 74 of proof mass 54, and each of stop posts 134 and 136 is located between a pair of extension members 146.

Like over-travel stop structure 102, stop posts 134 and 136 are narrower than the separation between pairs of extension members 146 such that a stop gap 148 is present on either side of each stop post 134 and 136. Accordingly, each of stop posts 134 and 136 is spaced apart from, and not touching, corresponding pairs of extension members 146 during nominal movement of proof mass 54 in y-direction 124. However, when MEMS accelerometer 130 experiences a harsh acceleration environment or excessive force in y-direction 124, proof mass 54 is subjected to overload movement causing an extension member 146 from each pair of extension members 146 to contact stop posts 134 and 136.

Thus, MEMS accelerometer 130 can detect acceleration in y-direction 124 as well as x-direction 68. In addition, distance limitation is provided in both directions 68 and 124 via over-travel stop structure 102 and over-travel stop structure 132 to protect MEMS accelerometer 130 from damage under harsh acceleration conditions.

Embodiments of the invention entail microelectromechanical systems (MEMS) accelerometers each of which have an over-travel stop structure arranged on an underlying substrate in such a manner so as to mitigate the adverse effects of substrate strain. More particularly, the over-travel stop structure includes stop anchors coupled to, or otherwise formed on, the surface of the substrate. The stop anchors are positioned on the substrate such that they reside at least partially within an anchor attach area bounded in the sense direction by locations of proof mass anchors that couple a movable proof mass to the substrate. Thus, the stop anchors are generally centrally positioned relative to locations of proof mass anchors. As such, the displacement of the stop anchors due to substrate strains incurred during high temperature processing and/or over various operational temperatures is matched to the resulting average displacement of the proof mass anchors due to substrate strains. Accordingly, a width of a stop gap between the movable proof mass and the non-moving stop structure remains largely unchanged over various temperatures. This results in improved accelerometer accuracy and improved overload performance.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A transducer adapted to sense acceleration comprising:
    a substrate;
    a proof mass positioned in spaced apart relationship above a surface of said substrate;
    at least one compliant member coupled to said proof mass, said at least one compliant member enabling said proof mass to move substantially parallel to said surface of said substrate in response to said acceleration in a sense direction;
    multiple proof mass anchors interconnecting said at least one compliant member with said surface, each of said multiple proof mass anchors being positioned on said surface at a perimeter of an anchor attach area in said sense direction, wherein separate locations of said proof mass anchors on said substrate define a centerline of said anchor attach area between said proof mass anchors that is perpendicular to said sense direction; and an over-travel stop structure having a stop anchor coupled to said substrate at a position on said surface of said substrate along said centerline.

2. A transducer as claimed in claim 1 wherein said stop anchor is a first stop anchor, and said over-travel stop structure further comprises a second stop anchor coupled to said substrate at a second position on said surface residing at least partially within said anchor attach area.

3. A transducer as claimed in claim 1 wherein:

said at least one compliant member further enables said proof mass to move substantially parallel to said surface of said substrate in response to said acceleration in a second sense direction, said second sense direction being perpendicular to said sense direction;

said separate locations of said proof mass anchors on said substrate define a second centerline of said anchor attach area between said proof mass anchors that is perpendicular to said second sense direction; and said transducer further comprises a second over-travel stop structure having a second stop anchor coupled to said substrate at a second position on said surface along said second centerline.

4. A transducer as claimed in claim 1 wherein said stop anchor is coupled to said surface of said substrate external to a periphery of said proof mass.

5. A transducer as claimed in claim 1 wherein said over-travel stop structure comprises a stop frame encircling a periphery of said proof mass.

6. A transducer as claimed in claim 5 wherein said stop frame is suspended above said substrate via an attachment of said stop frame to said stop anchor.

7. A transducer as claimed in claim 5 further comprising compliant anchor members interconnected between said stop frame and said substrate.

8. A transducer as claimed in claim 5 wherein said stop frame exhibits an inner perimeter that is greater than an outer perimeter of said proof mass such that said stop frame is spaced apart from said outer perimeter of said proof mass under nominal movement of said proof mass, and said proof mass contacts a portion of said stop frame under overload movement of said proof mass.

9. A transducer as claimed in claim 1 wherein said over-travel stop structure includes extension members extending from a periphery of said proof mass, and a stop post coupled with said stop anchor and located between a pair of said extension members.

10. A transducer as claimed in claim 9 wherein:

said pair of extension members are separated from one another by a spacing; and said stop post exhibits a width that is less than said spacing such that said stop post is spaced apart from each of said pair of said extension members under nominal movement of said proof mass, and one of said pair of said extension members contacts said stop post under overload movement of said proof mass.

11. A transducer adapted to sense acceleration comprising:

a substrate;

a proof mass positioned in spaced apart relationship above a surface of said substrate;

at least one compliant member coupled to said proof mass, said at least one compliant member enabling said proof mass to move substantially parallel to said surface of said substrate in response to said acceleration in a sense direction;

multiple proof mass anchors interconnecting said at least one compliant member with said surface, each of said multiple proof mass anchors being positioned on said surface at a perimeter of an anchor attach area in said sense direction, wherein separate locations of said proof mass anchors on said substrate define a centerline of said anchor attach area between said proof mass anchors that is perpendicular to said sense direction; and an over-travel stop structure including a first stop anchor, a second stop anchor, and a stop frame encircling a periphery of said proof mass, each of said first and second stop anchors being coupled to said substrate at positions on said surface of said substrate along said centerline, and said stop frame being attached to said first and second stop anchors.

12. A transducer as claimed in claim 11 wherein said stop frame is suspended above said substrate via an attachment of said stop frame to each of said first and second stop anchors.

13. A transducer as claimed in claim 11 further comprising compliant anchor members interconnected between said stop frame and said substrate.

* * * * *